US012803088B2

(12) United States Patent
Lee et al.

(10) Patent No.: US 12,803,088 B2
(45) Date of Patent: Nov. 17, 2026

(54) SECONDARY BATTERY

(71) Applicant: SAMSUNG SDI CO., LTD., Yongin-si (KR)

(72) Inventors: Hyun Soo Lee, Yongin-si (KR); Jun Seon Yong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 795 days.

(21) Appl. No.: 18/054,615

(22) Filed: Nov. 11, 2022

(65) Prior Publication Data

US 2023/0216112 A1 Jul. 6, 2023

(30) Foreign Application Priority Data

Jan. 5, 2022 (KR) ........................ 10-2022-0001464

(51) Int. Cl.
*H01M 50/119* (2021.01)
*H01M 50/103* (2021.01)
*H01M 50/159* (2021.01)
*H01M 50/176* (2021.01)
*H01M 50/548* (2021.01)

(52) U.S. Cl.
CPC ....... *H01M 50/119* (2021.01); *H01M 50/103* (2021.01); *H01M 50/159* (2021.01); *H01M 50/176* (2021.01); *H01M 50/548* (2021.01)

(58) Field of Classification Search
CPC ............. H01M 50/119; H01M 50/548; H01M 50/176; H01M 50/103
See application file for complete search history.

(56) References Cited

U.S. PATENT DOCUMENTS 5,462,820 A * 10/1995 Tanaka ................ H01M 50/491 429/332
5,510,203 A * 4/1996 Hamada ............ H01M 50/1385 429/151
2008/0038629 A1* 2/2008 Okabe ................. H01M 10/052 429/121
2011/0189513 A1* 8/2011 Suzuki ................ H01M 50/184 29/623.2
2012/0034513 A1* 2/2012 Kim .................... H01M 50/528 429/186
2016/0204392 A1 7/2016 Kim et al.
2018/0233788 A1* 8/2018 Goldman ............... A45D 20/12
2020/0251692 A1* 8/2020 Oh ........................ H01M 50/10
(Continued)

FOREIGN PATENT DOCUMENTS

KR 10-1563578 B1 10/2015
KR 10-2020-0022011 3/2020
KR 10-2021-0145489 A 12/2021

OTHER PUBLICATIONS

Korean Office Action dated Jul. 6, 2026, issued in Korean Patent Application No. 10-2022-0001464 (7 pages).

*Primary Examiner* — Kenneth J Douyette
(74) *Attorney, Agent, or Firm* — Womble Bond Dickinson (US) LLP

(57) ABSTRACT

A secondary battery includes: an electrode assembly; a case made of steel, in which openings are provided at opposite sides and in which the electrode assembly is arranged; a side terminal electrically connected to an electrode tab of the electrode assembly; and a cap plate made of steel, through which the side terminal passes and which is coupled to an opening of the openings.

11 Claims, 10 Drawing Sheets

(56) References Cited

U.S. PATENT DOCUMENTS

| | | | |
|---|---|---|---|
| 2022/0302533 | A1 | 9/2022 | Choi et al. |
| 2023/0246269 | A1 | 8/2023 | Choi et al. |
| 2023/0246270 | A1 | 8/2023 | Choi et al. |
| 2023/0253650 | A1 | 8/2023 | Choi et al. |

* cited by examiner

SECONDARY BATTERY

CROSS-REFERENCE TO RELATED APPLICATION

This application claims priority to and the benefit of Korean Patent Application No. 10-2022-0001464, filed on Jan. 5, 2022 in the Korean Intellectual Property Office, the entire content of which is herein incorporated by reference.

BACKGROUND

1. Field

Aspects of embodiments of the present disclosure relate to a secondary battery.

2. Description of the Related Art

Unlike a primary battery that cannot be charged, a secondary battery is a rechargeable and dischargeable battery. A low-capacity secondary battery comprised of one single cell packaged in the form of a pack may be used for various portable small-sized electronic devices, such as cellular phones or camcorders, and a high-capacity secondary battery in which several tens of cells are connected in a battery pack is widely used as a power source for motor drives, such as those in hybrid vehicles or electric vehicles.

The secondary battery may be configured by incorporating into a case an electrode assembly provided by interposing a separator between a positive electrode and a negative electrode, and an electrolyte, and installing a cap plate on the case. Here, a representative example of the electrode assembly may be of a winding type or a stack type.

The above information disclosed in this Background section is provided for enhancement of understanding of the background of the invention and, therefore, it may contain information that does not constitute prior art.

SUMMARY

According to an aspect of embodiments of the present disclosure, a secondary battery having a steel case is provided.

According to one or more embodiments, a secondary battery includes: an electrode assembly; a case made of steel, in which openings are provided at opposite sides and in which the electrode assembly is arranged; a side terminal electrically connected to an electrode tab of the electrode assembly; and a cap plate made of steel, through which the side terminal passes and which is coupled to an opening of the openings.

In one or more embodiments, the case and the cap plate may be made of stainless steel or carbon steel.

In one or more embodiments, the case may include stainless steel, and the cap plate may be made of carbon steel.

In one or more embodiments, the case and the cap plate may be made of SUS 304 series.

In one or more embodiments, the case may be bent in a "□" shape in a cross-section and may be welded.

In one or more embodiments, the case may be extruded in a "□" shape in a cross-section.

In one or more embodiments, the case may include a first short side; a second short side opposite to the first short side; a first long side connecting one side defined by the first and second short sides; and a second long side connecting the other side defined by the first and second short sides and facing the first long side, and thicknesses of the first and second short sides may be larger than thicknesses of the first and second long sides.

In one or more embodiments, the thickness of the first short side may be larger than the thickness of the second short side.

In one or more embodiments, the first short side portion may include a safety vent.

In one or more embodiments, the case may include: a first opening at one side defined by the first and second short sides and the first and second long sides; and a second opening at another side defined by the first and second short sides and the first and second long sides.

In one or more embodiments, the side terminal includes a first side terminal located in the first opening, and the secondary battery further includes a second side terminal located in the second opening, and the cap plate may include a first cap plate welded to the first opening and through which the first side terminal passes, and the secondary battery may further include a second cap plate welded to the second opening and through which the second side terminal passes.

DETAILED DESCRIPTION

Figure 1A:
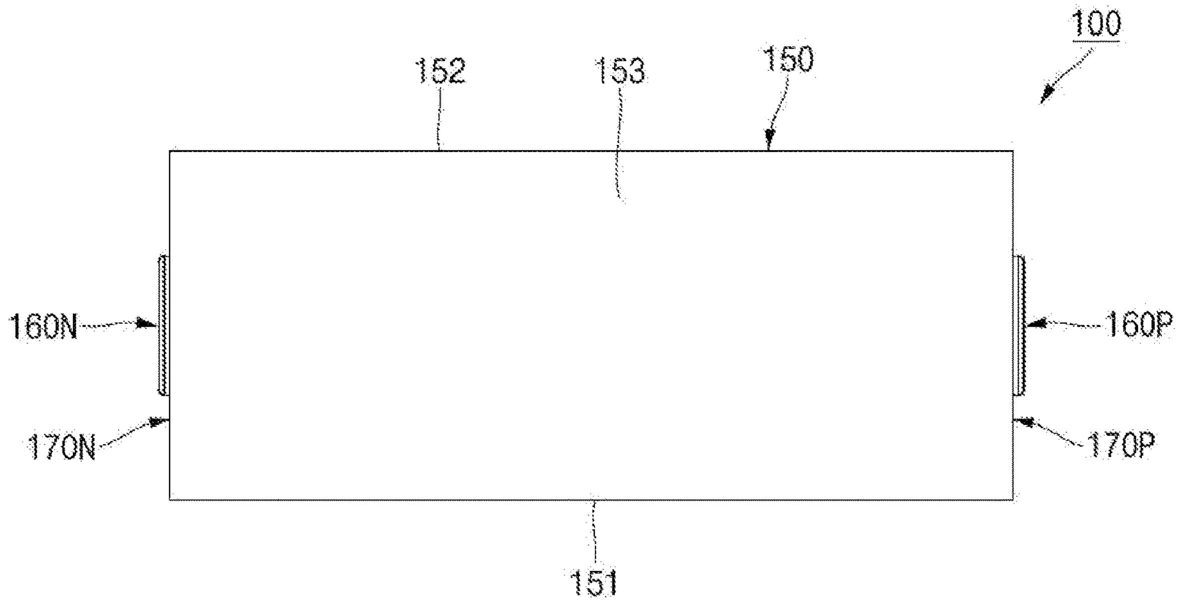
FIGS. 1A, 1B, 1C, 1D, 1E, and 1F area front view, a top view, a bottom view, a right side view, a left side view, and a perspective view illustrating a secondary battery according to an embodiment of the present disclosure.
Figure 1B:
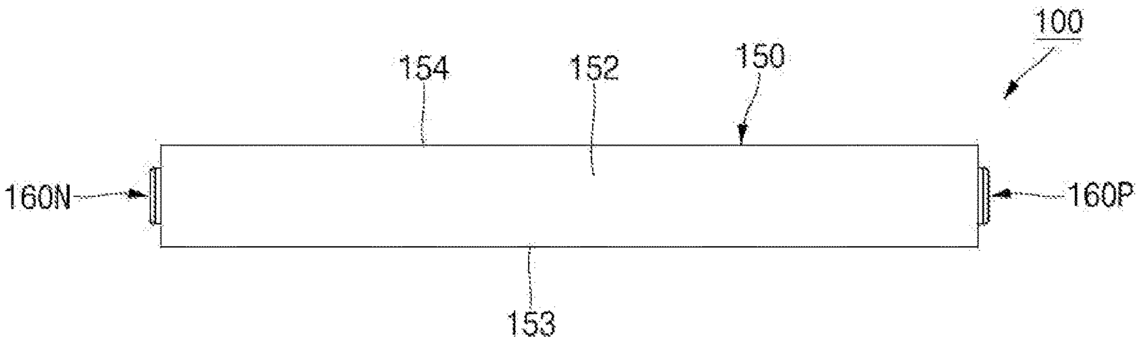
Figure 1C:
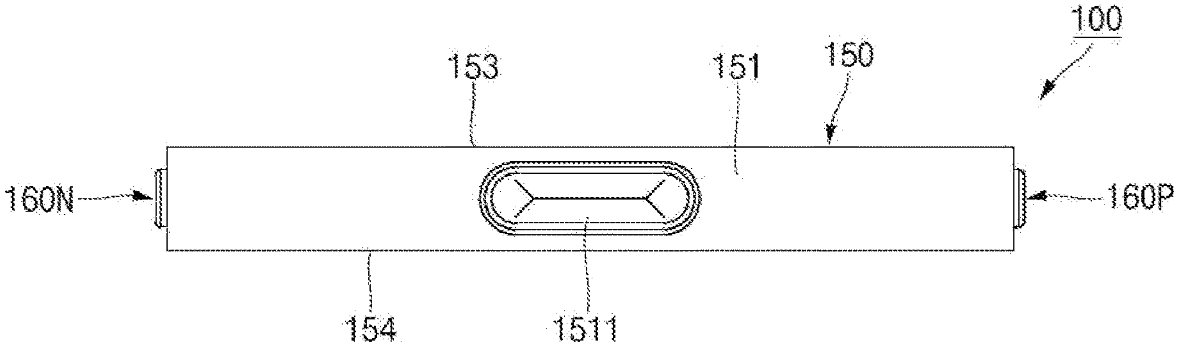
Figure 1D:
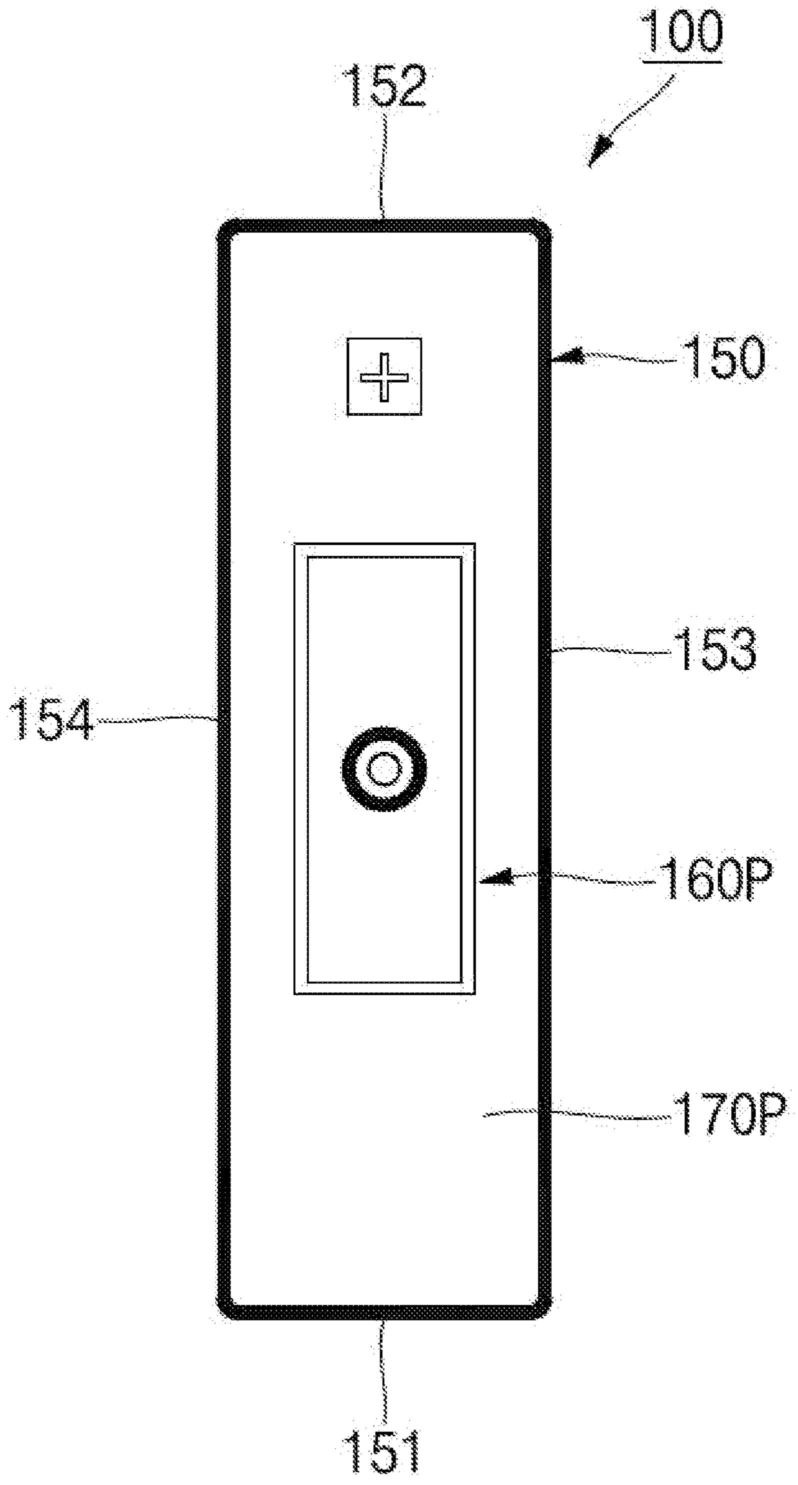
Figure 1E:
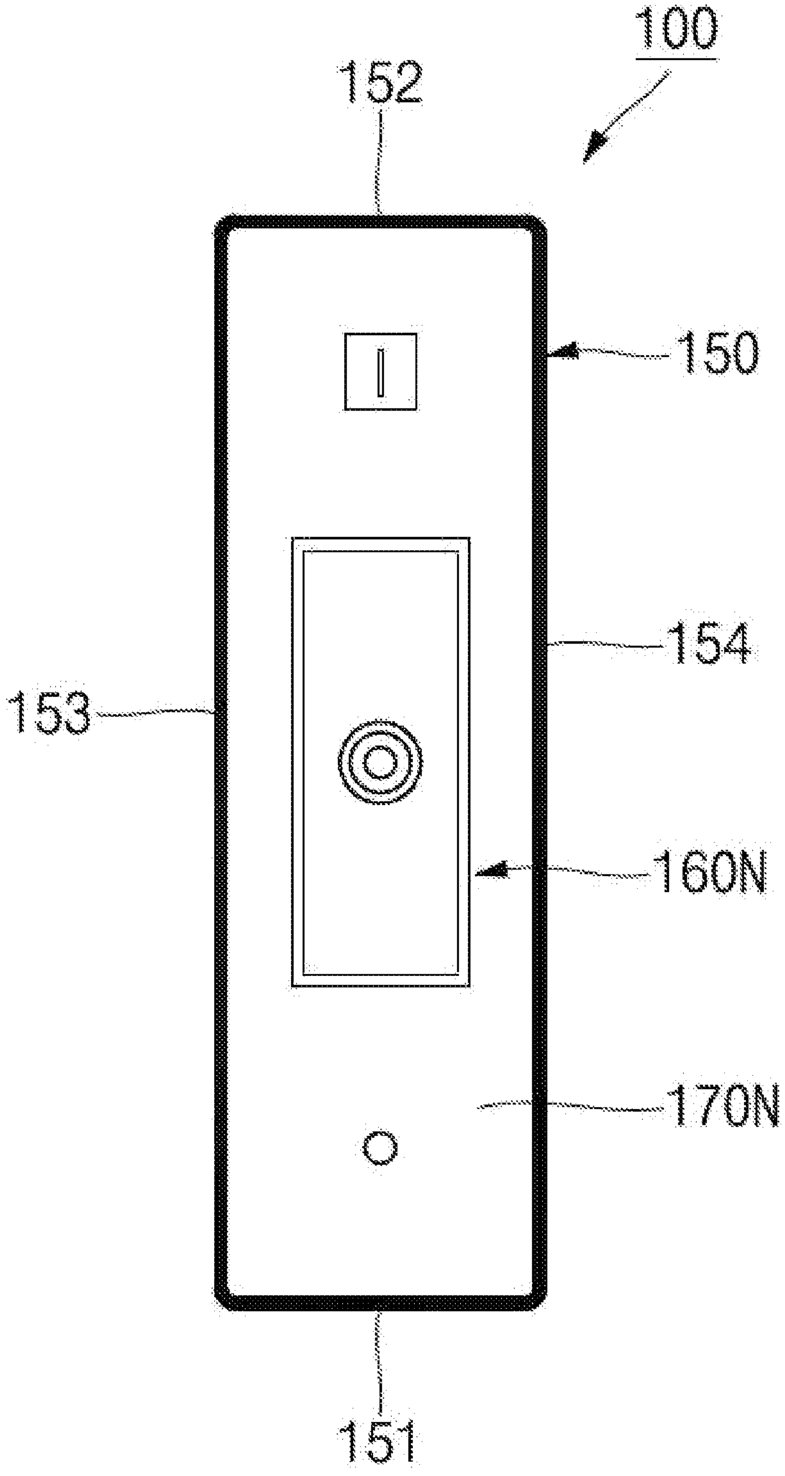

Herein, some embodiments of the present invention will be described in further detail with reference to the accompanying drawings.

Some examples of the present invention are provided to more completely explain the present invention to those skilled in the art; however, the following examples may be modified in various other forms. That is, the present invention may be embodied in many different forms and should not be construed as being limited to the example embodiments set forth herein. Rather, these example embodiments are provided so that this disclosure will be thorough and complete and will convey the aspects and features of the present invention to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising" when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the example term "below" can encompass both an orientation of above and below.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 1F:
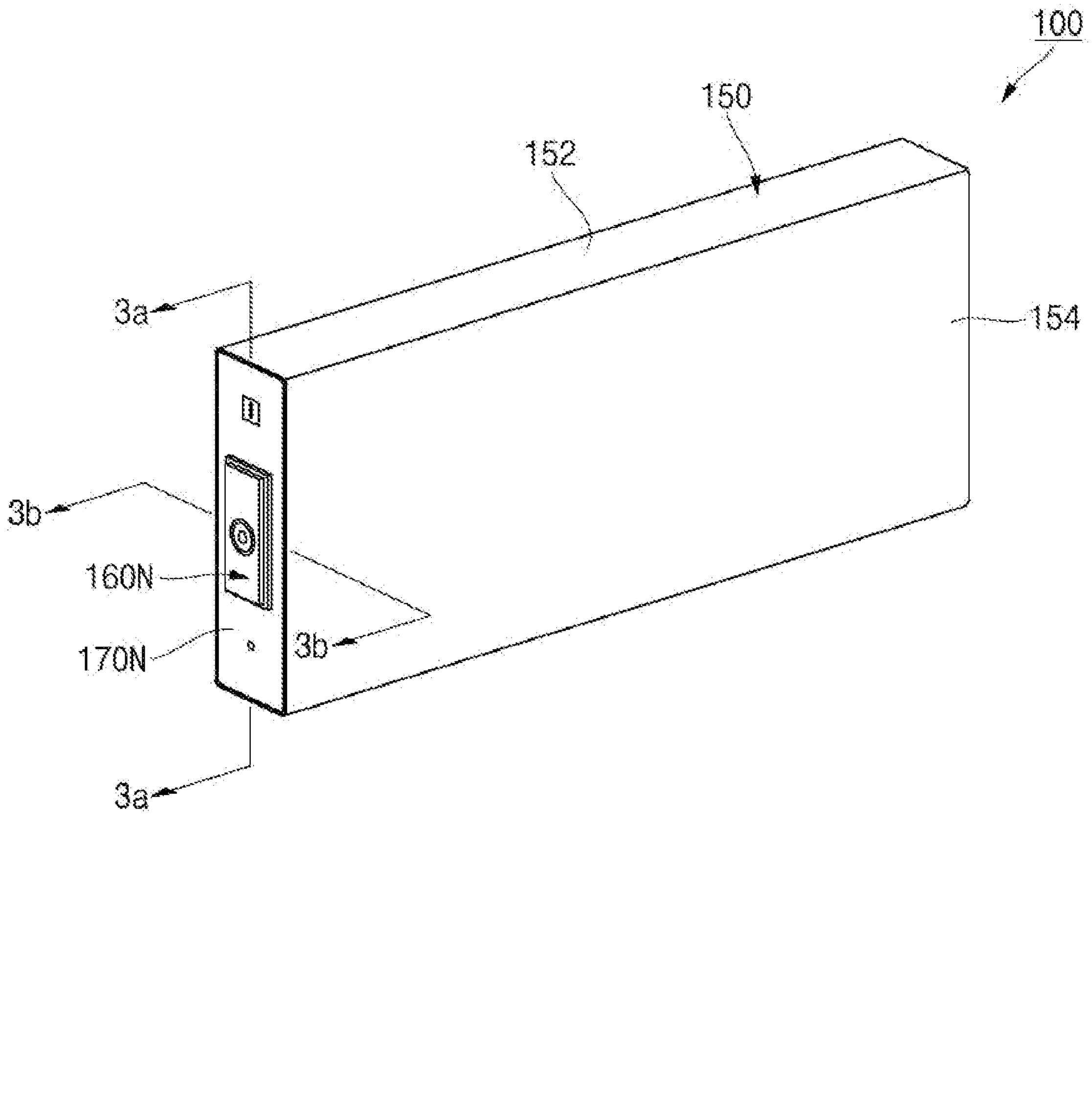
Figure 2A:
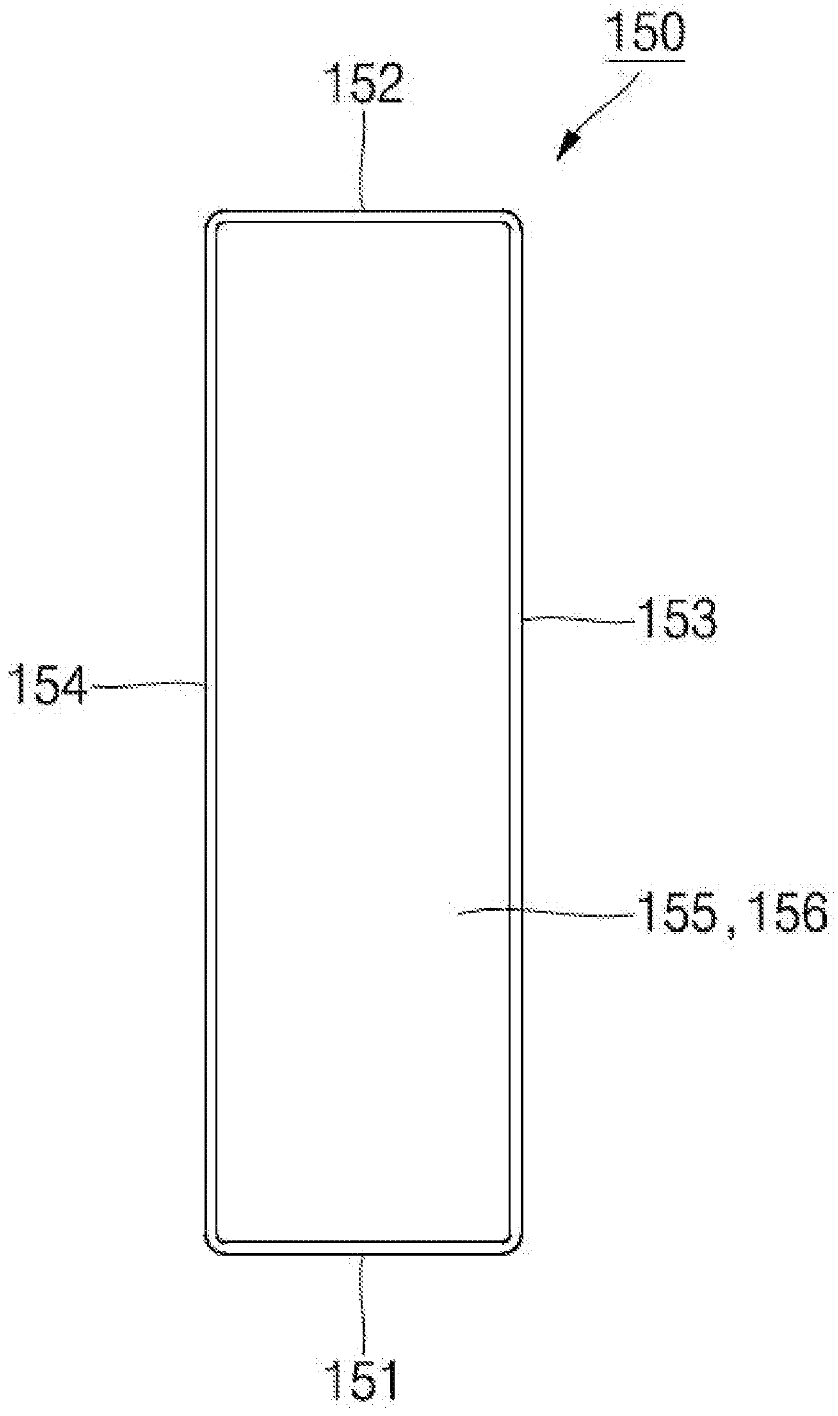
FIGS. 2A and 2B are cross-sectional views illustrating a case of a secondary battery according to some embodiments of the present disclosure.
Figure 2B:
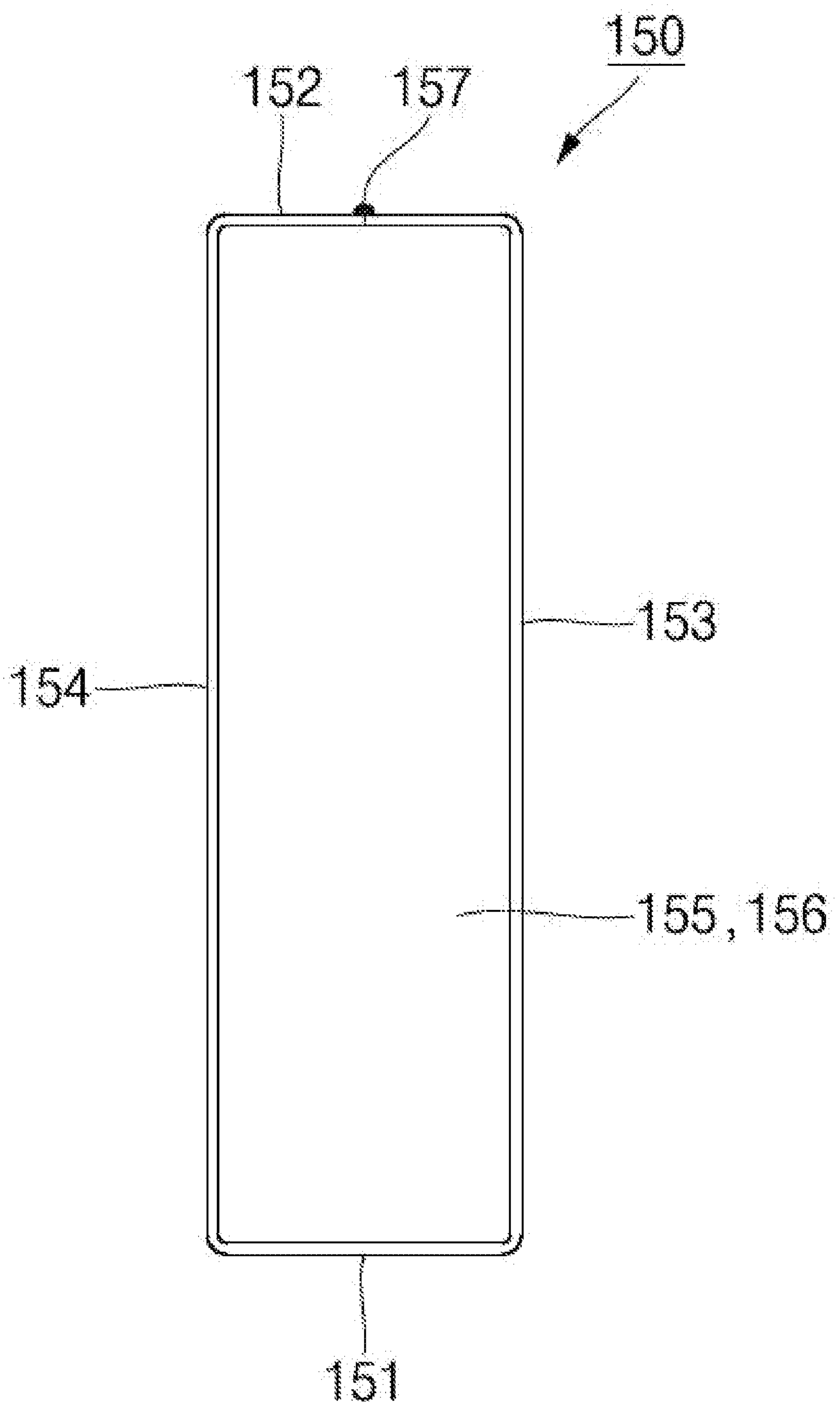
Figure 3A:
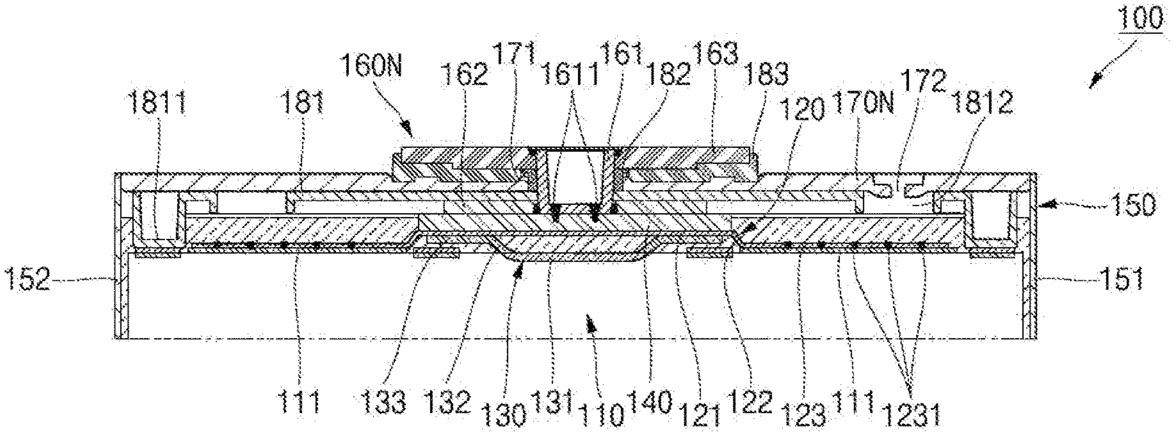
FIGS. 3A and 3B are cross-sectional views taken along the lines 3*a*-3*a* and 3*b*-3*b*, respectively, of FIG. 1F.
Figure 3B:
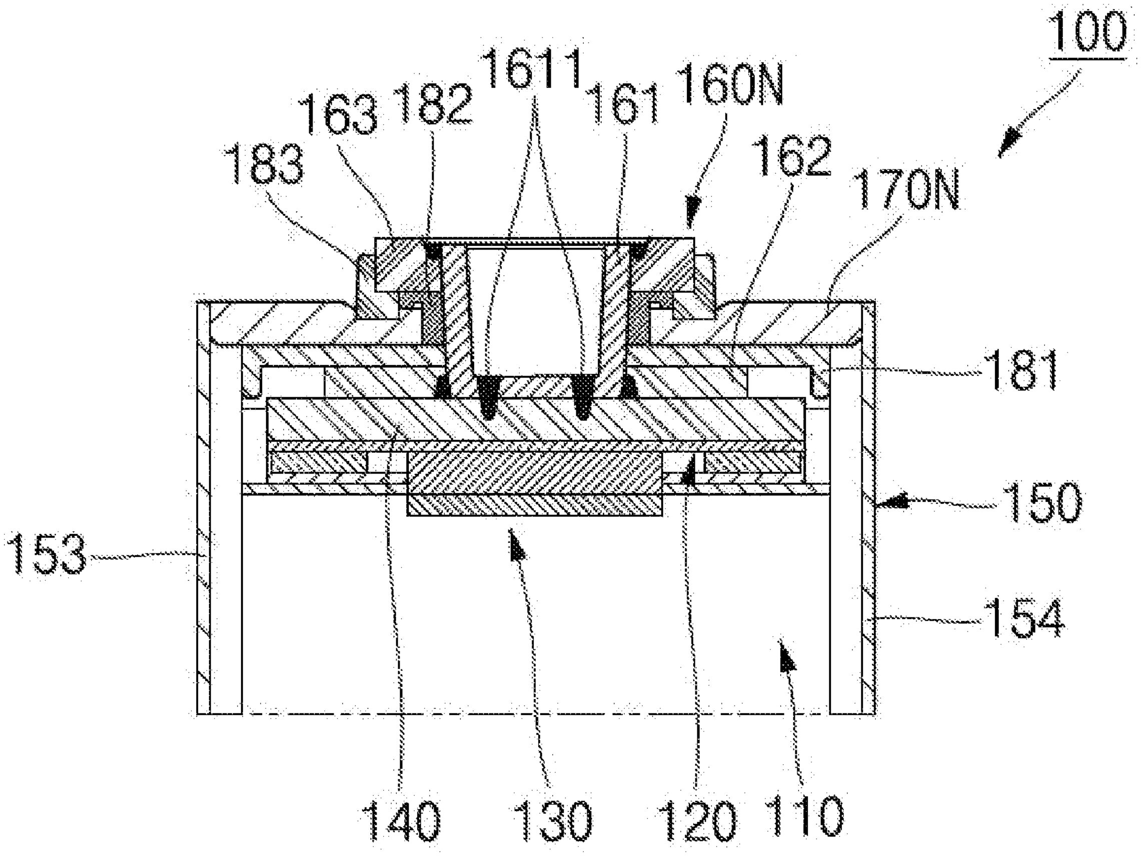

FIGS. 1A, 1B, 1C, 1D, 1E, and 1F are a front view, a top view, a bottom view, a right side view, a left side view, and a perspective view illustrating a secondary battery according to the present disclosure. FIGS. 2A and 2B are cross-sectional views illustrating a case of a secondary battery according to an embodiment of the present disclosure. FIGS. 3A and 3B are cross-sectional views taken along the lines 3*a*-3*a* and 3*b*-3*b* of FIG. 1F. Here, for convenience of description, FIGS. 3A and 3B illustrate that the secondary battery shown in FIG. 1F is rotated clockwise by 90°. Accordingly, the terms "upper" and "lower" in the following description may refer to "left" and "right."

In the example shown in FIGS. 1A to 3B, a secondary battery 100 according to the present disclosure may include an electrode assembly 110, a case 150, side terminals 160N and 160P, and cap plates 170N and 170P.

In some examples, the side terminals may include a negative-electrode side terminal 160N and a positive-electrode side terminal 160P. In some examples, the cap plates 170 may include a negative-side cap plate 170N and a positive-side cap plate 170P.

In an embodiment, the negative-electrode side terminal 160N and peripheral structures thereof may be similar to the positive-electrode side terminal 160P and peripheral structures thereof, and, therefore, the negative-electrode side terminal 160N and peripheral structures thereof will be mainly described in the following description.

Further, in an embodiment, the negative-electrode cap plate 170N and peripheral structures thereof may be similar to the positive-electrode cap plate 170P and peripheral structures thereof, and, therefore, the negative-electrode cap plate 170N and peripheral structures thereof will be mainly described in the following description.

The electrode assembly 110 may be provided by stacking or winding a laminate of a negative electrode plate, a separator, and a positive electrode plate, which are in forms of thin plates or films. In other words, the electrode assembly 110 may be of a stack type or a winding type. In some examples, two or more electrode assemblies may be positioned adjacent to each other in the electrode assembly 110.

In some examples, the negative electrode plate is provided by coating a negative electrode active material, such as graphite or carbon, on a negative electrode current collector provided in a metal foil such as copper, a copper alloy, nickel, or a nickel alloy, and may include a negative electrode uncoated portion tab (or a negative electrode tab) 111 that is a region to which the negative active material is not applied. In some examples, the negative electrode uncoated portion tab 111 may be provided by cutting in advance to protrude laterally when manufacturing the negative electrode plate, and may be formed integrally with the negative electrode plate. In some examples, the negative electrode uncoated portion tab 111 may include approximately two negative electrode uncoated portion tabs 111 protruding in the lateral direction of the electrode assembly 110. In some examples, the negative electrode uncoated portion tabs 111 may be provided at upper and lower portions (or left and right in FIG. 3A), respectively, with respect to the electrode assembly 110.

In some examples, the positive electrode plate is provided by coating a positive electrode active material, such as a transition metal oxide, on a positive electrode current collector made of a metal foil, such as aluminum or an aluminum alloy, and may include a positive electrode uncoated portion tab (or a positive electrode tab) (not shown) that is a region to which the positive active material is not applied. In some examples, the positive electrode uncoated tab may be provided by cutting in advance to protrude laterally when manufacturing the positive electrode plate, and may be formed integrally with the positive electrode plate. In some examples, the positive electrode uncoated portion tab may include approximately two positive electrode uncoated portion tabs 111 protruding in the lateral direction of the electrode assembly 110. In some examples, the positive electrode uncoated portion tabs may be provided at upper and lower portions, respectively, with respect to the electrode assembly 110. In some examples, the negative electrode uncoated portion tabs 111 and the positive electrode uncoated portion tabs may protrude in opposite directions.

In some examples, the separator is positioned between the negative electrode plate and the positive electrode plate to prevent or substantially prevent a short circuit and enable the movement of lithium ions, and may include polyethylene, polypropylene, or a composite film of polyethylene and polypropylene. In some examples, the separator may be replaced with an inorganic solid electrolyte, such as a sulfide-based, oxide-based, or phosphate-based electrolyte, which does not require a liquid or gel electrolyte.

In some examples, the electrode assembly 110 may be accommodated in the case 150 together with an electrolyte.

In some examples, the electrolyte may include a lithium salt, such as $LiPF_6$ or $LiBF_4$, in an organic solvent, such as ethylene carbonate (EC), propylene carbonate (PC), diethyl carbonate (DEC), ethylmethyl carbonate (EMC), or dimethyl carbonate (DMC). In addition, the electrolyte may be in a liquid or gel phase. In some examples, when an inorganic solid electrolyte is used, the electrolyte may be omitted.

In some examples, a structure electrically connected to the positive electrode plate of the secondary battery 100 may be the same as or similar to a structure electrically connected to the negative electrode plate. Therefore, for convenience of explanation, the following description will focus on a structure electrically connected to the negative electrode plate.

In some examples, a sub-plate 120 may be welded to the uncoated portion tabs 111 (the negative electrode uncoated portion tabs 111) of the electrode assembly 110. In some examples, since the uncoated portion tabs 111 may be provided spaced apart from each other on the upper and lower portions (left and right in FIG. 3A) with respect to the electrode assembly 110, the sub-plate 120 is also provided so as to correspond thereto.

In some examples, the sub-plate 120 may include a first sub-region 121, second sub-regions 122, and third sub-regions 123.

In some examples, the first sub-region 121 may be electrically coupled to a current collector member 140 and may be spaced apart from the electrode assembly 110 and the uncoated portion tabs 111.

In some examples, the second sub-regions 122 may be bent in upper and lower directions (left and right directions in FIG. 3A), respectively, on the basis of the first sub-region 121, to then extend. In some examples, the second sub-regions 122 may be bent from the first sub-region 121 toward the opposite uncoated portion tabs 111 to then extend.

In some examples, the third sub-regions 123 may extend from the second sub-regions 122, respectively, and may be welded to the uncoated portion tabs 111, respectively. In some examples, the third sub-regions 123 may be positioned parallel to the uncoated portion tabs 111. In this way, a plurality of welding regions 1231 may be provided between the third sub-regions 123 and the uncoated portion tabs 111. In some examples, the sub-plate 120 may include copper, nickel, aluminum, or stainless steel.

In some examples, an elastic member 130 may be interposed between the first sub-region 121 and the electrode assembly 110. In some examples, the elastic member 130 may be positioned between the uncoated portion tabs 111 spaced apart from each other. In some examples, the elastic member 130 may include a first elastic region 131, second elastic regions 132, and one or more third elastic regions 133.

In some examples, the first elastic region 131 may be in close contact with the electrode assembly 110. In some examples, the first elastic region 131 may be in close contact with a partial region of the electrode assembly 110 between the uncoated portion tabs 111.

In some examples, the second elastic regions 132 may be bent from the first elastic region 131 in upward and downward directions (left and right directions in FIG. 3A), respectively, and extend. In some examples, the second elastic regions 132 may be bent toward the first sub-region 121 to then extend.

In some examples, the one or more third elastic regions 133 may each extend from the second elastic regions 132 to be in close contact with the first sub-region 121, respectively.

In some examples, the elastic member 130 may generally have a cup shape, a saucer shape, or a "U" shape.

In some examples, the elastic member 130 may include an electric insulator. In some examples, the elastic member 130 may include polytetrafluoroethylene (PTFE), polyphenylene sulfide (PPS), polyphenylene (PP), or polyether ether ketone (PEEK) that does not react with an electrolyte.

In some examples, the elastic member 130 may support the current collector member 140 when the side terminal 160N is welded to the current collector member 140. Therefore, due to the elastic member 130, adhesion between the current collector member 140 and the side terminal 160N is improved, and, thus, welding quality can be improved.

In some examples, the current collector member 140 may be electrically connected to the sub-plate 120. The current collector member 140 may be provided on the first sub-region 121 of the sub-plate 120. In some examples, the current collector member 140 may be integrated with the sub-plate 120 or may be provided separately to be coupled to the sub-plate 120. In some examples, a thickness of the current collector member 140 may be larger than that of the sub-plate 120 or the first sub-region 121. In some examples, the current collector member 140 may include copper, nickel, aluminum, or stainless steel.

The case 150 may include openings 155 and 156 provided in opposite side directions (e.g., in a horizontal direction), and the electrode assembly 110 may be coupled through the openings 155 and 156.

The case 150 may include first and second short sides 151 and 152 and first and second long sides 153 and 154.

In some examples, curved portions may be provided in corner regions where both sides of the first short side 151 and the first and second long sides 153 and 154 meet, respectively, and curved portions may also be provided in corner regions where both sides of the second short side 152 and the first and second long sides 153 and 154 meet, respectively.

In some examples, the first short side 151 may have a substantially rectangular plate shape, and the second short side 152 faces the first short side 151 and may have a substantially rectangular plate shape. In some examples, the areas of the first and second short sides 151 and 152 may be similar to or the same as each other.

The first long side 153 connects first sides of the first and second short sides 151 and 152, and may have a substantially rectangular shape. An area of the first long side 153 may be larger than an area of the first short side 151 or an area of the second short side 152. The second long side 154 connects second sides of the first and second short sides 151 and 152 and may have a substantially rectangular shape. An area of the second long side 154 may be larger than the area of the first short side 151 or the area of the second short side 152. In some examples, the areas of the first and second long sides 153 and 154 may be similar to or the same as each other.

In some examples, a thickness of the first short side 151 or a thickness of the second short side 152 may be greater than a thickness of the first long side 153 or a thickness of the second long side 154. Accordingly, the rigidity and cooling performance of the case 150 may be improved.

In some examples, the thickness of the first short side 151 may be greater than the thickness of the second short side 152. In some examples, a safety vent 1511 may be provided on the first short side 151. In an embodiment, since the thickness of the first short side 151 is relatively larger than the thickness of the second short side 152, coupling (e.g., welding) of the safety vent 1511 is easily performed. In some examples, the safety vent 1511 includes a notch, and, when an internal pressure of the case 150 is greater than a reference pressure, the notch of the safety vent 1511 ruptures and internal gas may be discharged to the outside.

The openings of the case 150 may include a first opening 155 provided in a first side defined by the first and second short sides 151 and 152 and the first and second long sides 153 and 154, and a second opening 156 provided in a second side defined by the first and second short sides 151 and 152 and the first and second long sides 153 and 154, and the first and second openings 155 and 156 may be connected to each other in the horizontal direction. Accordingly, the electrode assembly 110 may be easily coupled to the case 150 in the horizontal direction through the first and second openings 155 and 156.

In some examples, the case 150 may be provided by being bent in a substantially "□" shape in a cross-section and then welded. In some examples, a welding region 157 (see FIG. 2B) may be provided on the first short side 151 or the second short side 152 in the horizontal direction by welding. In some examples, the welding region 157 may be provided on the first long side 153 or the second long side 154 in the horizontal direction by welding. In some examples, the welding region 157 may be provided along a corner region where the first short side 151 and the first long side 153 meet. In some examples, the welding region 157 may be provided along a corner region where the first short side 151 and the second long side 154 meet. In some examples, the welding region 157 may be provided along a corner region where the second short side 152 and the first long side 153 meet. In some examples, the welding region 157 may be provided along a corner region where the second short side 152 and the second long side 154 meet.

In some examples, the welding region 157 may be provided by a laser beam. The welding by a laser beam may include butt welding, overlap welding, edge welding, flange-type butt welding, or double-sided auxiliary-plate welding.

In some examples, the case 150 may be provided by being extruded in a substantially "□" shape in a cross-section. Extrusion is a processing method that allows a high-rigidity material, such as a metal, to pass through a die to produce a long product having a hole-like cross-sectional shape in the die. Since extrusion exhibits a high compressive force during processing, a product produced thereby may have a dense structure and good mechanical properties. Extrusion processing includes cold extrusion and hot extrusion, and, in embodiments of the present disclosure, the case 150 may be provided by hot extrusion. Since an oxide film, or insulating film, is formed on the surface of the case 150 by hot extrusion, an electrical short circuit between the electrode assembly 110 and the case 150 may be prevented or substantially prevented. In addition, a seamless case 150 (e.g., without a welding region) may be easily provided by hot extrusion.

In some examples, the case 150 may include stainless steel, SUS 304, or carbon steel. Accordingly, in embodiments of the present disclosure, by providing the case 150 by using steel having a higher strength relative to aluminum, the thickness of the case 150 may be reduced compared to the prior art. In addition, according to embodiments of the present disclosure, by providing the case 150 by using steel having a lower thermal conductivity than aluminum, a heat propagation phenomenon of the secondary battery can be reduced.

The side terminal 160N may be welded on the current collector member 140. In some examples, the side terminal 160N may include a hollow rivet 161, an inner terminal plate 162, and an outer terminal plate 163.

In some examples, the hollow rivet 161 may penetrate the cap plate 170N to then be welded onto the current collector member 140. In some examples, a bottom surface of the hollow rivet 161 may be welded to the current collector member 140. Accordingly, welding regions 1611 may be provided between the hollow rivet 161 and the current collector member 140. In some examples, the hollow rivet 161 may include a cup shape, a plate shape, or a "U" shape. In some examples, the hollow rivet 161 may include copper, nickel, aluminum, or stainless steel.

In some examples, the thickness of the current collector member 140 may be larger than a thickness of the side terminal 160N, for example, a thickness of the hollow rivet 161 or a bottom surface of the hollow rivet 161. Therefore, when the hollow rivet 161 is welded to the current collector member 140, the current collector member 140 may not be damaged. For example, if the thickness of the current collector member 140 is similar to or smaller than the thickness of the hollow rivet 161, only a through hole may be formed by a laser beam during a welding process, but welding may not be performed.

The inner terminal plate 162 may be located inside the cap plate 170N and welded to the hollow rivet 161. In some examples, the inner terminal plate 162 may be in close contact with the current collector member 140. In some examples, the inner terminal plate 162 may include copper, nickel, aluminum, or stainless steel. In some examples, the outer terminal plate 163 may be located on the outside of the cap plate 170N and welded to the hollow rivet 161. In some examples, the inner terminal plate 162 may include copper, nickel, aluminum, or stainless steel.

In some examples, an internal insulator 181 may be interposed between the cap plate 170N and the sub-plate 120 (including the current collector member 140 and the inner terminal plate 162). Accordingly, an electrical short circuit between the cap plate 170N and the sub-plate 120 (including the current collector member 140 and the inner terminal plate 162) may be prevented or substantially prevented.

In some examples, a sealing insulator 182 may be interposed between the cap plate 170 and the hollow rivet 161. Accordingly, an electrical short circuit between the cap plate 170 and the hollow rivet 161 may be prevented or substantially prevented, and electrolyte leakage may be prevented or substantially prevented. In some examples, an external insulator 183 may be interposed between the cap plate 170N and the outer terminal plate 163. In some examples, the insulators 181, 182, and 183 may include polytetrafluoroethylene (PTFE), polyphenylene sulfide (PPS), polyphenylene (PP), or polyether ether ketone (PEEK) that does not react with an electrolyte. In some examples, a highly resistant member (e.g., a member having resistance of 1 MΩ or more), instead of the external insulator 183, may be interposed between the cap plate 170N and the outer terminal plate 163. Accordingly, the side terminal 160, the cap plate 170N, and the case 150 may have the same polarity.

In some examples, the internal insulator 181 may further include a support protrusion 1811 interposed between the cap plate 170N and the electrode assembly 110 to support the cap plate 170N. In some examples, the support protrusion 1811 may be provided in regions close to the short sides 151 and 152 of the case 150.

Accordingly, when the cap plate 170N is welded to the case 150, the welding process may be performed in a state in which the periphery of the cap plate 170N is stably supported by the support protrusion 1811.

The cap plate 170N passes through the side terminal 160N and may be coupled to the first opening 155 of the case 150. The cap plate 170N may include a terminal hole 171, and the hollow rivet 161 of the side terminal 160N may pass through the terminal hole 171. As described above, the sealing insulator 182 may be interposed between the hollow rivet 161 and the inner wall of the terminal hole 171 of the cap plate 170N. In some examples, the cap plate 170N may include an injection hole 172 for injecting an electrolyte. In some examples, an injection plug may be coupled to the injection hole 172. In some examples, one or more injection holes 1812 may also be provided in the internal insulator 181 corresponding to the injection hole 172. In some examples, the injection holes 1812 are provided on opposite sides of the internal insulator 181, such that a battery assembling process may be facilitated, regardless of an assembly direction of the internal insulator 181.

In some examples, the cap plate 170N may be welded (e.g., by laser welding) to the first opening 155 of the case 150 along a periphery of the cap plate 170N. In some examples, the cap plate 170N may include stainless steel, SUS 304, or carbon steel. In some examples, the cap plate 170N is made of the same or a similar material as the case 150, such that the cap plate 170N may be easily welded to the case 150. In some examples, the cap plate 170N may include aluminum. In some examples, the negative-electrode side terminal 160N may be positioned in the opening 155 of one side of the case 150.

In some examples, the cap plate 170P may be welded (e.g., by laser welding) to the second opening 156 of the case 150 along a periphery of the cap plate 170P. In some examples, the cap plate 170P may include stainless steel, SUS 304, or carbon steel. In some examples, the cap plate 170P is made of the same or a similar material as the case 150, such that the cap plate 170P may be easily welded to the case 150. In some examples, the cap plate 170P may include aluminum. In some examples, the positive-electrode side terminal 160P may be positioned in the opening 156 of the other side of the case 150.

In some examples, the negative-electrode side terminal 160N may pass through the negative-electrode cap plate 170N, and the positive-electrode side terminal 160P may pass through the positive-electrode cap plate 170P.

In some examples, the case 150 and the cap plates 170N and 170P may include stainless steel.

In some examples, the case 150 and the cap plates 170N and 170P may include carbon steel.

In some examples, the case 150 may include stainless steel, and the cap plates 170N and 170P may include carbon steel.

In some examples, the case 150 and the cap plates 170N and 170P may include SUS 304 series.

In some examples, the case 150 may include SUS 304, and the cap plates 170N and 170P may include carbon steel.

In some examples, the positive-electrode side terminal 160P provided at the rear (or at the right) of the secondary battery 100 and peripheral structures thereof (e.g., a cap plate, a sub-plate, a current collector member, etc.) may be similar to or the same as the above-described negative-electrode side terminal and surrounding structures thereof, and, thus, further description thereof will be omitted.

Figure 4:
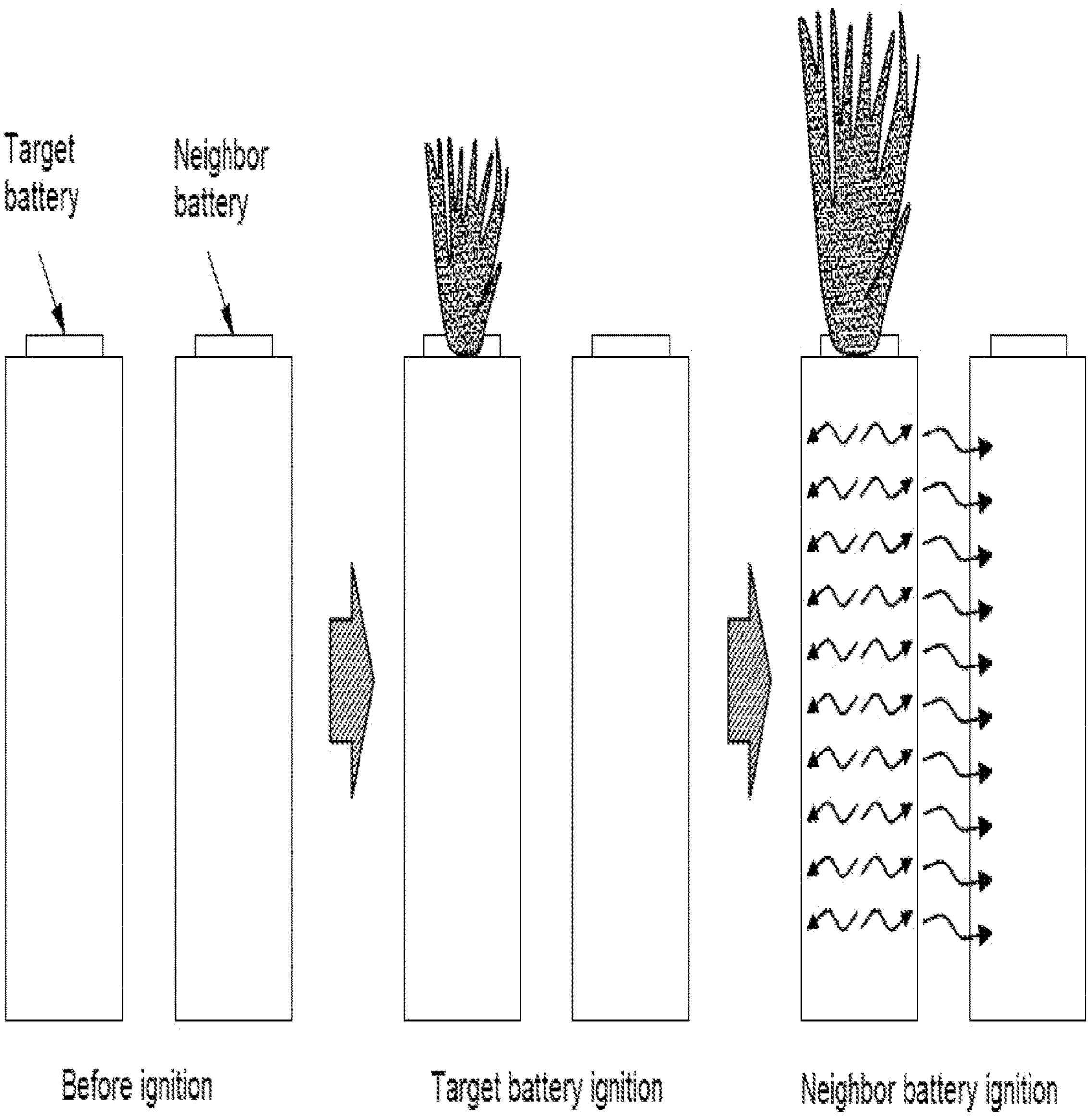
FIG. 4 is a diagram illustrating a decrease in heat propagation of a secondary battery according to an embodiment of the present disclosure.

FIG. 4 is a diagram illustrating a decrease in heat propagation of a secondary battery according to an embodiment of the present disclosure. As shown in FIG. 4, in embodiments of the present disclosure, since the thermal conductivity of a steel case is lower than that of an aluminum case, a heat propagation phenomenon may be reduced. In some examples, a plurality of secondary batteries may be arranged in the horizontal direction to constitute a battery module, and ignition may occur to any one of the plurality of secondary batteries. In this case, since the thermal conductivity of steel compared to aluminum is low, the heat of a secondary battery where ignition has occurred is not readily propagated to a neighboring secondary battery.

In this way, embodiments of the present disclosure provide a secondary battery having a steel case and side terminals. For example, embodiments of the present disclosure may provide a secondary battery capable of reducing the case thickness by using a steel case having a higher strength than an aluminum case. In addition, embodiments of the present disclosure may provide a secondary battery capable of reducing heat propagation by using a steel case having lower thermal conductivity compared to an aluminum case.

In some examples, in the present disclosure, since terminals are provided in left and right regions, respectively, battery cooling can be performed concurrently (e.g., simultaneously) in upper and lower regions, thereby improving battery cooling efficiency. Conventionally, since all terminals are provided in an upper region of a secondary battery, it is difficult to cool the upper region of the secondary battery.

In addition, compared to a secondary battery in which two terminals are provided in the upper region, according to embodiments of the present disclosure, a terminal is provided in each of the left and right regions, thereby improving space utilization. Conventionally, since all terminals are provided on the upper region of a secondary battery, the space utilization rate of the upper region of the secondary battery is reduced.

In addition, according to embodiments of the present disclosure, since terminals are respectively arranged in the horizontal direction in the left and right regions, a charge/discharge current may flow in the horizontal direction, and, thus, battery deterioration may be reduced. Conventionally, as all terminals are provided on the upper portion of a secondary battery, there would be a problem in that a specific area of the secondary battery may be rapidly deteriorated as the charge/discharge current flows in an approximately "U"-shaped path.

While one or more embodiments have been described herein, the present disclosure is not limited thereto, and it will be understood by a person skilled in the art that various changes in form and details may be made therein without departing from the spirit and scope of the present disclosure as set forth in the following claims.

What is claimed is:

1. A secondary battery comprising:
- an electrode assembly;
- a case made of steel, in which openings are provided at opposite sides and in which the electrode assembly is arranged;
- a side terminal electrically connected to an electrode tab of the electrode assembly;
- a sub-plate welded to the electrode tab of the electrode assembly;

a current collector member electrically coupling the sub-plate to the side terminal; and a cap plate made of steel, through which the side terminal passes and which is coupled to an opening of the openings, wherein the side terminal is welded to the current collector member at a region overlapping a first region of the sub-plate, and the sub-plate is welded to the electrode tab at another region of the sub-plate that is spaced apart from the first region.

2. The secondary battery of claim 1, wherein the case and the cap plate are made of stainless steel or carbon steel.

3. The secondary battery of claim 1, wherein the case is made of stainless steel, and the cap plate is made of carbon steel.

4. The secondary battery of claim 1, wherein the case and the cap plate are made of SUS 304 series.

5. The secondary battery of claim 1, wherein the case is bent in a "□" shape in a cross-section and is welded.

6. The secondary battery of claim 1, wherein the case is extruded in a "□" shape in a cross-section.

7. The secondary battery of claim 1, wherein the case comprises:

a first short side;

a second short side opposite to the first short side;

a first long side connecting the first and second short sides; and a second long side connecting the first and second short sides and facing the first long side, wherein thicknesses of the first and second short sides are larger than thicknesses of the first and second long sides.

8. The secondary battery of claim 7, wherein the thickness of the first short side is larger than the thickness of the second short side.

9. The secondary battery of claim 8, wherein the first short side comprises a safety vent.

10. The secondary battery of claim 7, wherein the case comprises:

a first opening of the openings at one side defined by the first and second short sides and the first and second long sides; and a second opening of the openings at another side defined by the first and second short sides and the first and second long sides.

11. The secondary battery of claim 10, wherein the side terminal comprises a first side terminal located in the first opening, and the secondary battery further comprises a second side terminal located in the second opening, and the cap plate comprises a first cap plate welded to the first opening and through which the first side terminal passes, and the secondary battery further comprises a second cap plate welded to the second opening and through which the second side terminal passes.

* * * * *